US012579394B2

(12) United States Patent
    Tanaka

(10) Patent No.:    US 12,579,394 B2
(45) Date of Patent:        Mar. 17, 2026

(54) SHEET CONVEYING APPARATUS

(71) Applicant: Toshiba Tec Kabushiki Kaisha, Tokyo
            (JP)

(72) Inventor: Masaya Tanaka, Sunto Shizuoka (JP)

(73) Assignee: **TOSHIBA TEC KABUSHIKI
            KAISHA**, Tokyo (JP)

( * ) Notice: Subject to any disclaimer, the term of this
            patent is extended or adjusted under 35
            U.S.C. 154(b) by 8 days.

(21) Appl. No.: 18/667,454

(22) Filed: May 17, 2024

(65) Prior Publication Data

US 2025/0206553 A1      Jun. 26, 2025

(30) Foreign Application Priority Data

Dec. 20, 2023    (JP) ................................. 2023-214786

(51) Int. Cl.
    *G06K 17/00*        (2006.01)
    *G03G 21/16*        (2006.01)
    *H04N 1/00*         (2006.01)
    *H04N 1/32*         (2006.01)
(52) U.S. Cl.
    CPC ..... *G06K 17/0025* (2013.01); *G03G 21/1657*
        (2013.01); *H04N 1/00342* (2013.01); *H04N
        1/32138* (2013.01); *B65H 2511/24* (2013.01);
                    *B65H 2801/06* (2013.01)
(58) Field of Classification Search
    CPC ........... G06K 17/0025; H04N 1/32138; H04N
            1/00342; G03G 21/1657; B65H 2553/52;
                                        B65H 2701/1244
    See application file for complete search history.

(56) References Cited

U.S. PATENT DOCUMENTS 8,107,101 B2 *    1/2012    Powers .................. G06K 17/00
                                                    358/1.14
11,643,291 B2 *    5/2023    Nakamura ......... H04N 1/00342
                                                    271/265.01
2006/0226987 A1    10/2006    Nagase
                    (Continued)

FOREIGN PATENT DOCUMENTS

JP        2006-240749 A      9/2006
JP        2008-140217 A      6/2008
JP        4795175 B2        10/2011

OTHER PUBLICATIONS

Extended European Search Report dated Jan. 31, 2025 issued in EP
Application No. 24181654.5, 8 pages.

*Primary Examiner* — Jeremy R Severson
(74) *Attorney, Agent, or Firm* — FOLEY & LARDNER
LLP

(57)            ABSTRACT

Provided is a sheet conveying apparatus capable of suppressing occurrence of an error related to reading and writing of information from and to a wireless tag. A sheet conveying apparatus includes a reading and writing unit, a detection unit, and an instruction unit. The reading and writing unit reads and writes information from and to a wireless tag provided on a sheet when the sheet passes through a predetermined position on a conveyance path. The detection unit is disposed upstream of the predetermined position in a sheet conveying direction and detects the sheet. The instruction unit issues an instruction related to reading and writing of information from and to the wireless tag based on a timing at which the sheet is detected by the detection unit.

13 Claims, 4 Drawing Sheets

(56) References Cited

U.S. PATENT DOCUMENTS

| | | |
|---|---|---|
| 2018/0239289 A1 | 8/2018 | Takada |
| 2022/0053106 A1 | 2/2022 | Nakayama et al. |
| 2022/0194726 A1 | 6/2022 | Nakamura et al. |

* cited by examiner

Figure 3:
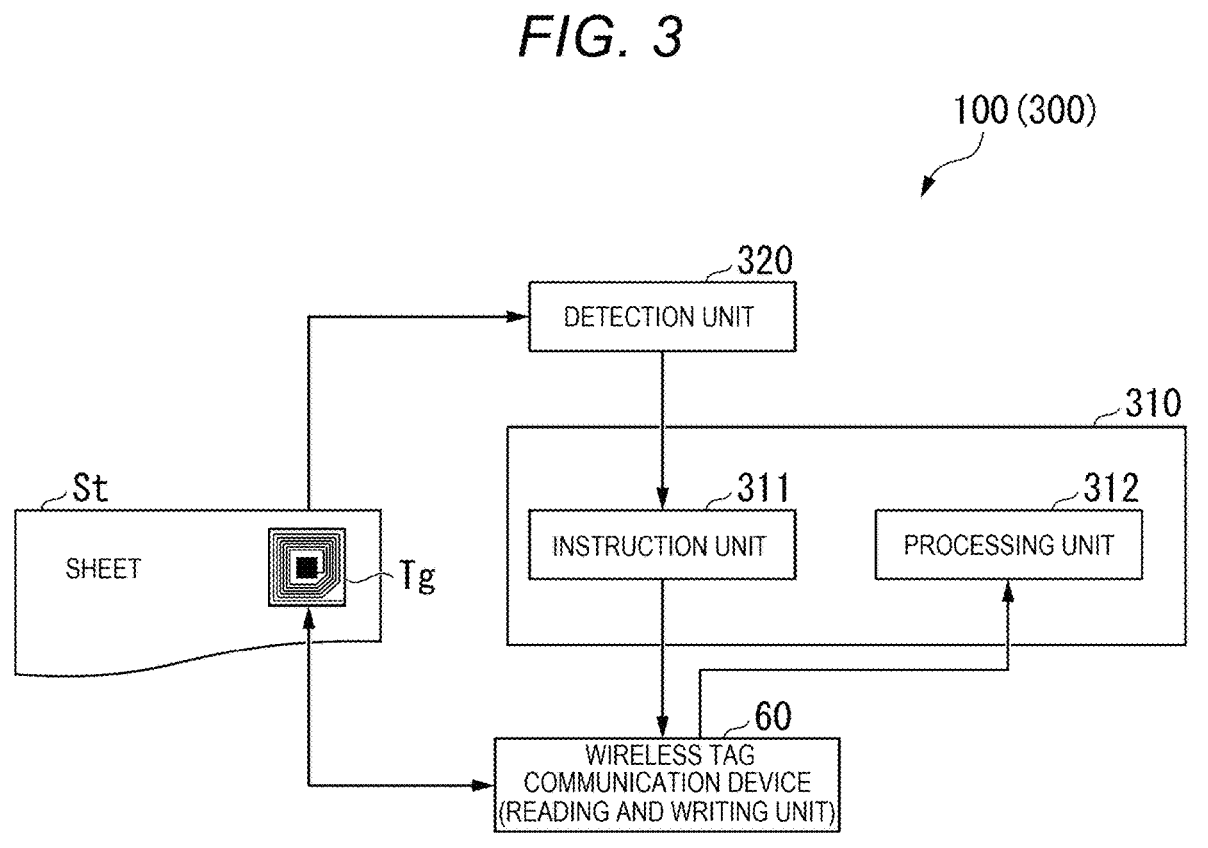

320
DETECTION UNIT

310

311
INSTRUCTION UNIT

312
PROCESSING UNIT

St
SHEET

Tg

60
WIRELESS TAG
COMMUNICATION DEVICE
(READING AND WRITING UNIT)

FIG. 4

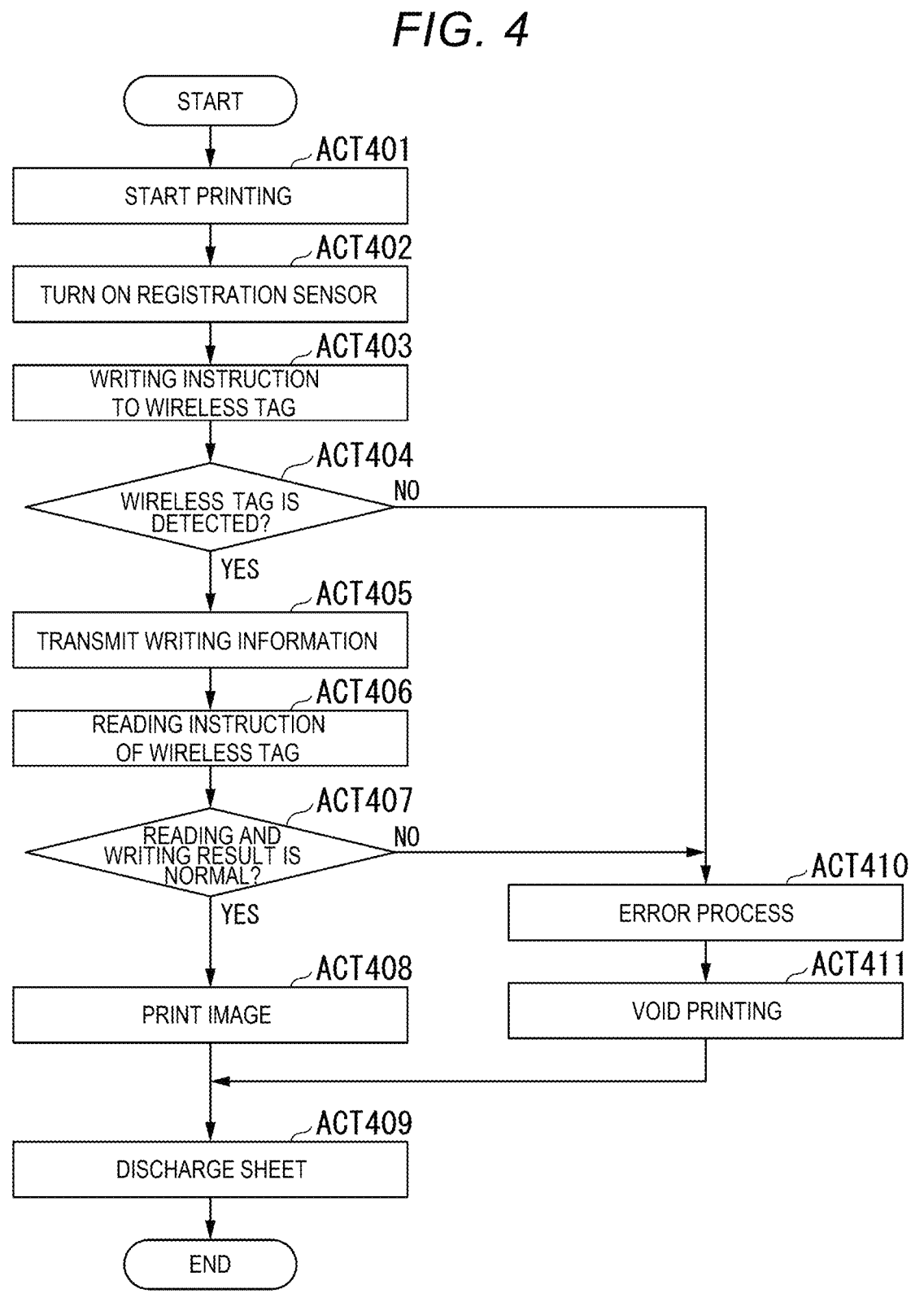

```
            ( START )
                |
                | ACT401
                ▼
    ┌─────────────────────────┐
    │      START PRINTING      │
    └─────────────────────────┘
                |
                | ACT402
                ▼
    ┌─────────────────────────┐
    │ TURN ON REGISTRATION     │
    │        SENSOR            │
    └─────────────────────────┘
                |
                | ACT403
                ▼
    ┌─────────────────────────┐
    │   WRITING INSTRUCTION    │
    │    TO WIRELESS TAG       │
    └─────────────────────────┘
                |
                | ACT404
                ▼
         ◇─────────────◇   NO
        ◇  WIRELESS TAG IS ◇──────────────────────┐
         ◇   DETECTED?    ◇                        │
          ◇─────────────◇                          │
                | YES                              │
                | ACT405                           │
                ▼                                  │
    ┌─────────────────────────┐                    │
    │ TRANSMIT WRITING         │                    │
    │     INFORMATION          │                    │
    └─────────────────────────┘                    │
                |                                  │
                | ACT406                           │
                ▼                                  │
    ┌─────────────────────────┐                    │
    │   READING INSTRUCTION    │                    │
    │    OF WIRELESS TAG       │                    │
    └─────────────────────────┘                    │
                |                                  │
                | ACT407                           │
                ▼                                  │
         ◇─────────────◇   NO                      │
        ◇ READING AND    ◇─────────────────┐       │
        ◇ WRITING RESULT IS ◇              │       │
        ◇    NORMAL?      ◇                │       │
          ◇─────────────◇                  ▼       ▼
                | YES              ┌──────────────────┐ ACT410
                | ACT408          │   ERROR PROCESS    │
                ▼                 └──────────────────┘
    ┌─────────────────────────┐            |
    │      PRINT IMAGE         │            | ACT411
    └─────────────────────────┘            ▼
                |              ┌──────────────────┐
                |              │   VOID PRINTING    │
                |              └──────────────────┘
                |                       |
                ◄───────────────────────┘
                | ACT409
                ▼
    ┌─────────────────────────┐
    │     DISCHARGE SHEET      │
    └─────────────────────────┘
                |
                ▼
            (  END  )
```

SHEET CONVEYING APPARATUS

CROSS-REFERENCE TO RELATED APPLICATION

This application is based upon and claims the benefit of priority from Japanese Patent Application No. 2023-214786, filed on Dec. 20, 2023, the entire contents of which are incorporated herein by reference.

FIELD

Embodiments described herein relate to a sheet conveying apparatus.

BACKGROUND

In the related art, a sheet provided with a wireless tag may be used in an image forming apparatus such as a printer or a multifunction peripheral. Various kinds of information are written in the wireless tag. The information is written to the wireless tag, for example, on a conveyance path along which the sheet is conveyed.

The image forming apparatus reads and writes information from and to the wireless tag. Specifically, when information is written to the wireless tag, the image forming apparatus reads the information from the wireless tag. Here, in the related art, radio waves of both the sheet and a wireless tag communication device may be shielded depending on a positional relation therebetween, and writing of information to the wireless tag or reading of information to the wireless tag was not appropriately performed in some cases.

Specifically, for example, the wireless tag and the wireless tag communication device may be at a positional relation at which the radio waves of both the wireless tag and the wireless tag communication device are shielded at the time of reading information from the wireless tag depending on a timing at which the information is written to the wireless tag, and accordingly, the information was not be appropriately read from the wireless tag in some cases. Therefore, many errors related to reading and writing of information from and to the wireless tag occurred in the related art.

DESCRIPTION OF THE DRAWINGS

FIG. 2 is a diagram illustrating an example of an internal configuration of the image forming apparatus;

FIG. 3 is a block diagram illustrating an example of a functional configuration of a sheet conveying apparatus; and FIG. 4 is a flowchart illustrating an example of processes related to reading and writing of information from and to a wireless tag.

DETAILED DESCRIPTION

Figure 1:
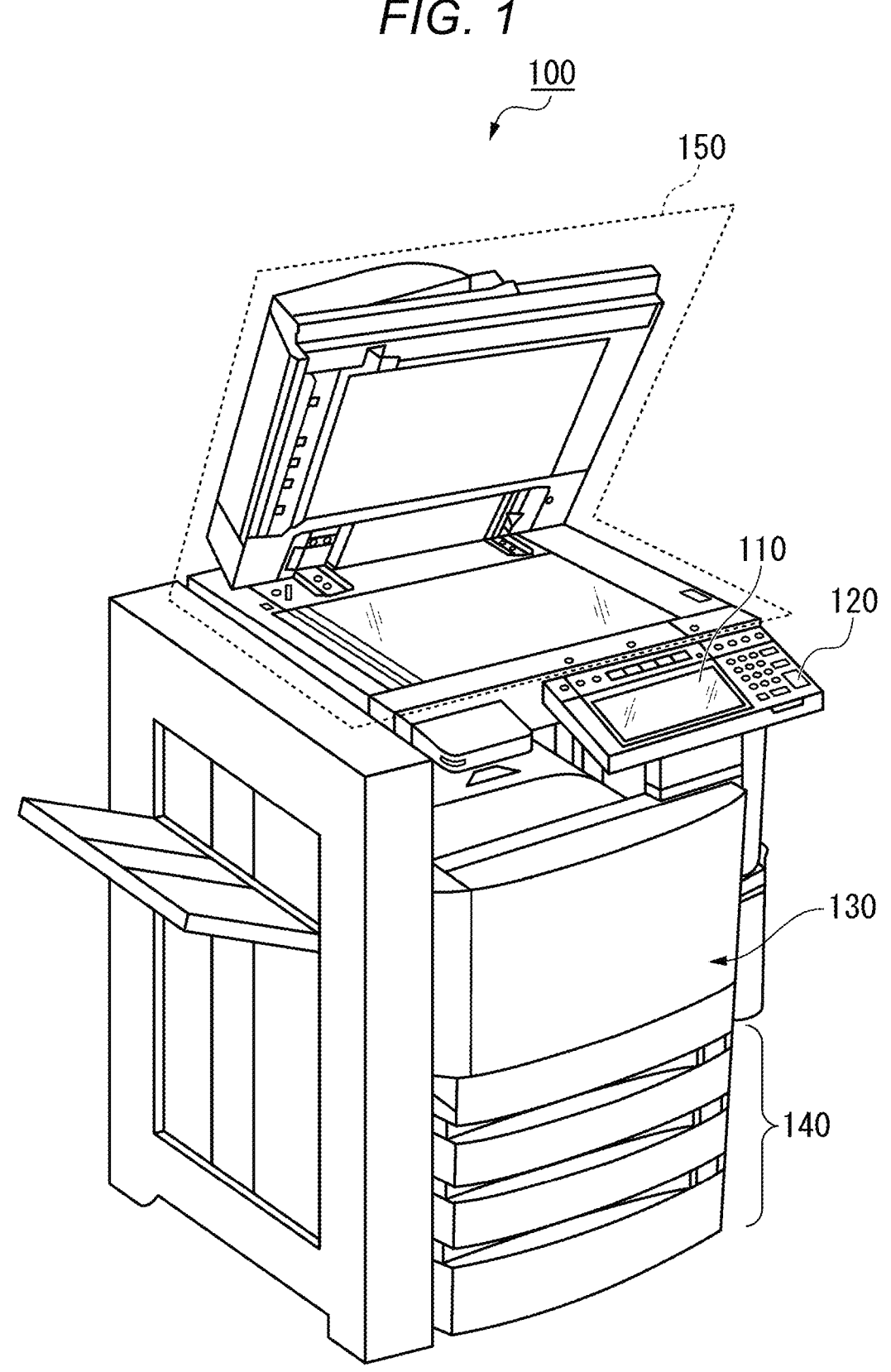
FIG. 1 is an external view illustrating an overall configuration example of an image forming apparatus according to at least one embodiment.

An object is to provide a sheet conveying apparatus capable of suppressing occurrence of an error related to reading and writing of information from and to a wireless tag.

In general, according to at least one embodiment, a sheet conveying apparatus includes a reading and writing unit (reader/writer), a detection unit (detector), and an instruction unit. The reading and writing unit reads and writes information from and to a wireless tag provided on a sheet when the sheet passes through a predetermined position on a conveyance path. The detection unit is disposed upstream of the predetermined position in a sheet conveying direction and detects the sheet. The instruction unit issues an instruction related to reading and writing of information from and to the wireless tag based on a timing at which the sheet is detected by the detection unit.

Hereinafter, a sheet conveying apparatus according to the embodiment will be described with reference to the drawings. In the following description, components having the same or similar functions are denoted by the same reference numerals. Redundant description of the configuration may be omitted.

First, an overall configuration of an image forming apparatus 100 will be described with reference to FIG. 1.

FIG. 1 is an external view illustrating an overall configuration example of the image forming apparatus 100 according to at least one embodiment. The image forming apparatus 100 is, for example, a multifunction peripheral (MFP). The image forming apparatus 100 is disposed, for example, in a work place such as an office. As illustrated in FIG. 1, the image forming apparatus 100 includes a display 110, a control panel 120, a printer 130, a sheet storage unit 140, and an image reading unit 150.

The display 110 is, for example, a touch panel type liquid crystal display. The display 110 displays various types of information. The display 110 receives various input operations from a user. The display 110 outputs operation signals corresponding to various input operations received from the user.

The control panel 120 includes various operation keys such as a ten key and a start key. The control panel 120 receives various input operations from the user. The control panel 120 outputs operation signals corresponding to various input operations received from the user.

The printer 130 performs a series of printing operations using various types of information output from the display 110, the control panel 120, the image reading unit 150, and the like. The series of printing operations include an operation of inputting image information, an operation of forming an image, an operation of transferring the formed image to a sheet, and an operation of conveying the sheet.

The sheet storage unit 140 includes a plurality of sheet cassettes. Each sheet cassette stores sheets for each type of sheets. The type of the sheet includes a sheet size and a sheet type. For example, the size of the sheet is A5 size, A4 size, and A3 size. The sheet type is a normal copy sheet, a sheet provided with a wireless tag, or the like. The wireless tag is, for example, a radio frequency identifier (RFID) tag. In addition, the sheet type includes a photographic sheet, a label sheet, a polyester film sheet, and the like.

In the present embodiment, the plurality of sheet cassettes include a sheet cassette in which a normal copy sheet is stored and a sheet cassette in which a wireless tag is stored. The image forming apparatus 100 stores the sheet cassettes and the types of the sheets to be stored in association with each other. This association may be set by an operation of an operator such as a user or a check staff. When information indicating the type of the sheet to be printed is acquired, the image forming apparatus 100 can specify the type of the sheet based on the information and specify the sheet cassette in which the specified sheet is stored.

The image reading unit 150 includes an automatic document feeder and a scanner. The automatic document feeder feeds a document placed on a document tray to the scanner. The scanner optically reads a document fed by the automatic document feeder or a document placed on a document glass table. Then, the scanner forms an image of reflected light from the document on a light receiving surface of a charge coupled device (CCD) sensor. Accordingly, the scanner can read a document image. The image reading unit 150 generates image information (image data) using a reading result read by the scanner.

Internal Configuration of Image Forming Apparatus 100

Figure 2:
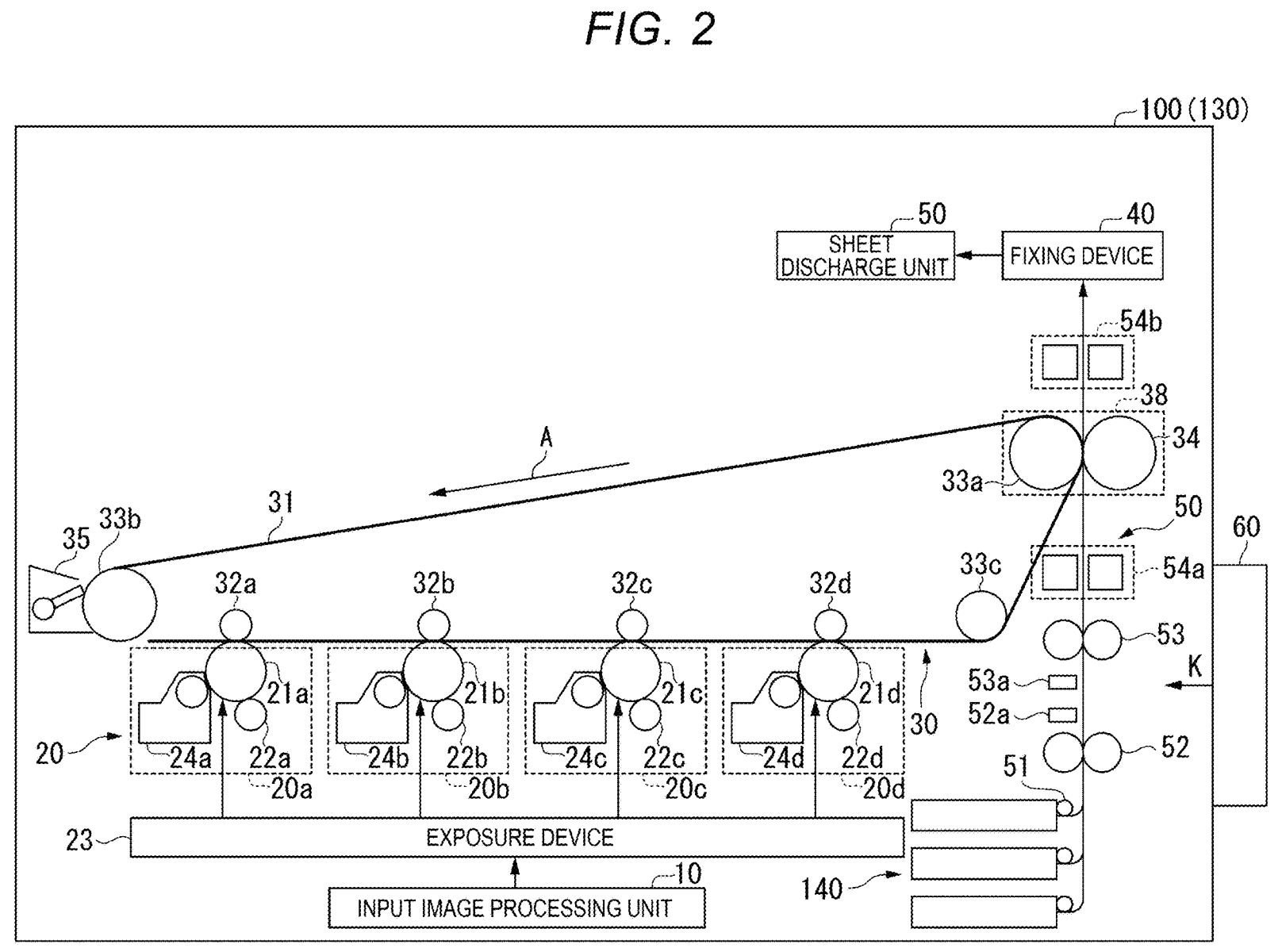

FIG. 2 is a diagram illustrating an example of an internal configuration of the image forming apparatus 100. As illustrated in FIG. 2, the image forming apparatus 100 (printer 130) is a so-called quadruple tandem-type image forming apparatus. The image forming apparatus 100 includes an input image processing unit 10, an image forming unit 20 (20a to 20d), an intermediate transfer unit 30, a fixing device 40, a sheet conveying unit 50, and a wireless tag communication device 60. In the following description, reference numerals a to d are appropriately omitted.

Input Image Processing Unit 10

The input image processing unit 10 inputs image information. The input image information is image information generated by the image reading unit 150 or image information transmitted from another device such as a personal computer. The input image processing unit 10 performs a digital image process of processing the input image information in accordance with initial setting or user setting. For example, the digital image process includes gradation correction based on gradation correction data. In addition to the gradation correction, the digital image process includes, with respect to image data, various types of correction processes such as color correction and shading correction and processes such as compression.

Image Forming Unit 20

Next, the image forming unit 20 (image forming units 20a to 20d) will be described. The four image forming units 20a to 20d are provided in parallel. The image forming units 20a to 20d correspond to respective colors. Specifically, the image forming unit 20a corresponds to Y (yellow). The image forming unit 20b corresponds to M (magenta). The image forming unit 20c corresponds to C (cyan). The image forming unit 20d corresponds to K (black).

Each image forming unit 20 (20a to 20d) includes a photoconductor drum 21 (21a to 21d), a charger 22 (22a to 22d), an exposure device 23, a development device 24 (24a to 24d), a drum cleaning device (not illustrated), and the like.

The photoconductor drum 21 is, for example, a charge type organic photoconductor (OPC). Specifically, the photoconductor drum 21 is a charge type organic photoconductor in which an undercoat layer, a charge generation layer, and a charge transport layer are sequentially laminated on a circumferential surface of a conductive cylinder made of aluminum. The photoconductor drum 21 has photoconductivity.

The charger 22 generates corona discharge. The charger 22 uniformly charges a surface of the photoconductor drum 21.

The exposure device 23 is, for example, a semiconductor laser. The exposure device 23 irradiates the photoconductor drum 21 with laser light corresponding to an image of each color component. When the laser light is irradiated by the exposure device 23, a potential of an area irradiated with the laser light, of areas of the surface of the photoconductor drum 21, changes. Due to this potential change (potential difference), an electrostatic latent image is formed on the surface of the photoconductor drum 21.

The development device 24 contains a developer. The development device 24 attaches a toner of each color component to the surface of the photoconductor drum 21. Accordingly, a toner image is formed on the photoconductor drum 21. That is, the electrostatic latent image formed on the surface of the photoconductor drum 21 is visualized.

As the developer, for example, a two-component developer is used. The two-component developer includes a non-magnetic toner and a carrier. The carrier is, for example, iron powder having a particle diameter of several tens of $\mu m$ or polymer ferrite particles. The carrier is mixed with the toner in the development device 24 and is triboelectrically charged, thereby applying electric charge (for example, negative electric charge) to the toner. The carrier conveys the toner to an electrostatic latent image portion by magnetic force.

The drum cleaning device not illustrated includes a cleaning blade and a toner storage unit. The cleaning blade is in contact with the surface of the photoconductor drum 21 to remove residual toner. The residual toner is a toner remaining on the surface of the photoconductor drum 21 after primary transfer. The removed residual toner is collected in the toner storage unit.

Intermediate Transfer Unit 30

Next, the intermediate transfer unit 30 will be described. The intermediate transfer unit 30 includes an intermediate transfer body 31, a primary transfer roller 32, a plurality of support rollers 33, a secondary transfer roller 34, a belt cleaning device 35, and the like.

The intermediate transfer body 31 is, for example, an endless belt (transfer belt). For example, the intermediate transfer body 31 is a belt made of polyimide. The intermediate transfer body 31 may have conductivity and elasticity, or may not have conductivity and elasticity.

The support rollers 33a to 33c support the intermediate transfer body 31 so that a tension is applied to the intermediate transfer body 31. Accordingly, the intermediate transfer body 31 is formed in a loop shape. One roller (for example, the support roller 33a) of the plurality of support rollers 33a to 33c is a drive roller. Rollers other than the drive roller are driven rollers. When the drive roller is driven and rotated, the intermediate transfer body 31 travels at a predetermined speed and a predetermined cycle in a direction A in the drawing.

The direction in which the intermediate transfer body 31 moves can be defined as an upstream direction and a downstream direction. Specifically, the direction in which the intermediate transfer body 31 moves can be defined with the image forming unit 20a as the most upstream and the belt cleaning device 35 as the most downstream.

The primary transfer roller 32 is disposed to face the photoconductor drum 21 via the intermediate transfer body 31. Specifically, the primary transfer roller 32 is disposed such that a pressure is applied to the photoconductor drum 21 with the intermediate transfer body 31 interposed therebetween. Accordingly, the primary transfer roller 32 and the photoconductor drum 21 form a primary transfer unit that nips the intermediate transfer body 31.

When the intermediate transfer body 31 passes through the primary transfer unit, a toner image formed on the photoconductor drum 21 is transferred to the passed portion. When the intermediate transfer body 31 passes through the primary transfer unit, a primary transfer bias is applied to the primary transfer roller 32. Specifically, an electric charge having a polarity (positive polarity) opposite to that of the toner is applied to the primary transfer roller 32. Accordingly, the toner image formed on the photoconductor drum 21 is electrostatically transferred to the intermediate transfer body 31.

The secondary transfer roller 34 is disposed to face the support roller 33a via the intermediate transfer body 31. Specifically, the secondary transfer roller 34 is disposed such that a pressure is applied to the support roller 33a with the intermediate transfer body 31 interposed therebetween. Accordingly, the secondary transfer roller 34 and the support roller 33a form a secondary transfer unit 38 that nips the intermediate transfer body 31 and the sheet.

When the sheet passes through the secondary transfer unit 38, the toner image formed on the intermediate transfer body 31 is transferred to the passed portion. When the sheet passes through the secondary transfer unit 38, a secondary transfer bias is applied to the support roller 33a. Specifically, an electric charge having the same polarity (negative polarity) as the toner is applied to the support roller 33a. Accordingly, the toner image formed on the intermediate transfer body 31 is electrostatically transferred to the sheet.

The secondary transfer roller 34 and the support roller 33a may be separated from each other. Accordingly, when the sheet is jammed in the secondary transfer unit 38, the user can remove the sheet.

The belt cleaning device 35 includes a cleaning blade and a toner storage unit. The cleaning blade is in contact with the surface of the intermediate transfer body 31 to remove a residual toner. The residual toner as used herein is a toner remaining on the surface of the intermediate transfer body 31 after the secondary transfer. The residual toner removed by the cleaning blade is collected in the toner storage unit.

Fixing Device 40

The fixing device 40 heats and presses the sheet on which the toner image is transferred. The fixing device 40 includes, for example, an endless heating belt that heats the sheet and a pressing roller that is pressed against the heating belt. A heater is provided inside the heating belt. The heating belt is heated and a nip area is formed between the heating belt and the pressing roller, whereby the toner on the sheet melts and is fixed to the sheet when the sheet passes through the nip area.

Sheet Conveying Unit 50

Next, the sheet conveying unit 50 will be described. The sheet conveying unit 50 includes a pickup roller 51, a conveyance sensor 52a, a conveyance roller 52, a registration sensor 53a, a registration roller 53, a first guide unit 54a, a second guide unit 54b, and a sheet discharge unit 55. The sheet stored in the sheet storage unit 140 is conveyed from the pickup roller 51 toward the sheet discharge unit 55. Hereinafter, in the sheet conveying direction, the pickup roller 51 side may be referred to as "upstream", and the sheet discharge unit 55 side may be referred to as "downstream".

The pickup roller 51 picks up the sheets stored in the sheet storage unit 140 one by one, and conveys the picked-up sheets downstream (conveyance roller 52) in the sheet conveying direction. The conveyance sensor 52a detects the sheet fed from the pickup roller 51. The conveyance roller 52 conveys the sheet fed from the pickup roller 51 downstream (registration roller 53) based on a detection result of the conveyance sensor 52a.

The registration sensor 53a detects that the sheet fed from the conveyance roller 52 reaches the registration roller 53. The conveyance sensor 52a and the registration sensor 53a may be contact sensors or non-contact sensors (for example, optical sensors).

The registration roller 53 (example of registration unit) aligns a sheet feeding timing when the sheet is fed to the secondary transfer unit 38. Specifically, the registration roller 53 stops the sheet conveyed from the conveyance roller 52 based on a detection result of the registration sensor 53a, and feeds the sheet toward the secondary transfer unit 38 at a predetermined timing. The predetermined timing is a timing at which the toner image formed on the intermediate transfer body 31 is secondarily transferred by the secondary transfer unit 38.

The registration roller 53 forms a nip. The registration roller 53 aligns a leading end of the sheet conveyed from the conveyance roller 52 at the nip, and then conveys the sheet downstream. The image forming apparatus 100 performs aligning of the sheet. The aligning is a process of aligning orientations of the sheet by abutting the leading end of the sheet against the registration roller 53. That is, the registration roller 53 is a portion against which the leading end of the conveyed sheet abuts and sheet alignment is performed.

The first guide unit 54a regulates the conveying direction of the sheet fed from the registration roller 53 to the secondary transfer unit 38. The toner image is transferred by the secondary transfer unit 38 to the sheet of which the conveying direction is regulated by the first guide unit 54a. Further, the sheet to which the toner image is transferred is fed toward the second guide unit 54b and the fixing device 40 by the secondary transfer unit 38.

The second guide unit 54b regulates the conveying direction of the sheet fed from the secondary transfer unit 38 and feeds the sheet to the fixing device 40. The fixing device 40 heats and presses the sheet of which the conveying direction is regulated by the second guide unit 54b, and feeds the sheet to the sheet discharge unit 55. The sheet discharge unit 55 feeds the sheet to a discharge tray.

Wireless Tag Communication Device 60

The wireless tag communication device 60 includes a communication control circuit (control unit) and an antenna (not illustrated). The wireless tag in the present embodiment is, for example, an RFID tag. The wireless tag communication device 60 transmits a radio wave, for example, in an arrow K direction in the drawing. The wireless tag communication device 60 communicates with the wireless tag provided on the sheet via the antenna. Specifically, the wireless tag communication device 60 has a function of writing information to the wireless tag (write function) and a function of reading information written to the wireless tag (read function).

Specifically, the wireless tag communication device 60 performs a writing process of writing information to the wireless tag of the sheet picked up from the sheet storage unit 140 and a reading process of reading information from the wireless tag in order to confirm that the information is written to the wireless tag. The wireless tag communication device 60 performs the writing process and the reading process when the sheet passes through a predetermined position on the conveyance path (on the sheet conveying unit 50). The predetermined position is, for example, a position between when the sheet is picked up by the pickup roller 51 and when the sheet reaches the secondary transfer unit (secondary transfer roller 34). That is, a communication range is an area from an arrangement position of the pickup roller 51 to an arrangement position of the secondary transfer roller 34. In other words, an area not included in the communication range is an area inside the sheet storage unit 140 or an area downstream of the secondary transfer unit (secondary transfer roller 34).

The information to be written to the wireless tag includes, for example, information indicating contents, information indicating a destination, contents to be printed on a sheet, and the like, when the sheet is used for distribution or the like. The wireless tag communication device 60 uses, for example, a radio-frequency method (UHF) of a 900 MHz band. A frequency band is not limited thereto, and another frequency band may be adopted. A method of the wireless tag is not limited to the RFID method, and another method may be adopted.

The wireless tag communication device 60 is not limited to being disposed at the illustrated position. For example, the wireless tag communication device 60 may be disposed at a sheet feeding unit (sheet storage unit 140) side or may be disposed at the sheet discharge unit 55 side as compared with the illustrated position. The communication range may be a range corresponding to the position where the wireless tag communication device 60 is disposed.

Regarding Occurrence of Error Related to Reading and Writing of Information from and to Wireless Tag Here, when information is written to the wireless tag, the image forming apparatus 100 reads the information from the wireless tag. In the related art, radio waves of both the sheet and the wireless tag communication device 60 may be shielded depending on a positional relation therebetween, and writing of information from and to the wireless tag was not appropriately performed in some cases.

Specifically, for example, the wireless tag and the wireless tag communication device 60 may be at a positional relation at which the radio waves of both the wireless tag and the wireless tag communication device 60 are shielded at the time of reading information from the wireless tag depending on a timing at which the information is written to the wireless tag, and accordingly, the information was not be appropriately read from the wireless tag in some cases. Therefore, many errors related to reading and writing of information from and to the wireless tag occurred in the related art.

Thus, in the present embodiment, the occurrence of such an error is suppressed. Hereinafter, a functional configuration of the sheet conveying apparatus 300 included in the image forming apparatus 100 according to the present embodiment will be described.

Functional Configuration of Sheet Conveying Apparatus

FIG. 3 is a block diagram illustrating an example of a functional configuration of the sheet conveying apparatus 300 according to the present embodiment. In FIG. 3, the sheet conveying apparatus 300 includes an image formation control unit 310, a detection unit 320, and the wireless tag communication device 60. The image formation control unit 310 (instruction unit 311 and processing unit 312) controls the wireless tag communication device 60 in accordance with a sheet conveyance program stored in a storage device (not illustrated). The image formation control unit 310 controls the wireless tag communication device 60 via communication. The communication may be performed in a wired manner or in a wireless manner (for example, Bluetooth (registered trademark) Low Energy (BLE)).

The image formation control unit 310 is implemented by, for example, a central processing unit (CPU) or an application specific integrated circuit (ASIC). The storage device (not illustrated) is implemented by a read only memory (ROM), a random access memory (RAM), a hard disk device (HDD), a solid state drive (SSD), or the like.

A sheet St is provided with a wireless tag Tg. The wireless tag Tg is provided at a leading end (head side in the conveying direction) of the sheet St. The leading end of the sheet St is an area of a head portion of the sheet St in the conveying direction. An arrangement position of the wireless tag Tg is not limited to the leading end of the sheet St, and may be a rear end of the sheet St, or may be an outer peripheral portion excluding the leading end and the rear end.

Reading and Writing Unit

The wireless tag communication device 60 is an example of the reading and writing unit (reader/writer). As described above, the wireless tag communication device 60 reads and writes information from and to the wireless tag Tg when the sheet passes through a predetermined position on the conveyance path. In particular, the predetermined position is a position (hereinafter, referred to as a "registration position") at which the sheet is aligned by the registration roller 53.

Detection Unit 320

The detection unit 320 detects the leading end of the sheet St. The detection unit 320 is disposed upstream, in the sheet conveying direction, of a transfer unit (for example, the secondary transfer unit 38) that transfers an image to the sheet St. The detection unit 320 detects the leading end of the sheet St fed from the sheet storage unit 140. For example, the detection unit 320 is at least one of the conveyance sensor 52*a* and the registration sensor 53*a*. In the present embodiment, the detection unit 320 is the registration sensor 53*a*.

Instruction Unit 311

The image formation control unit 310 includes the instruction unit 311 and the processing unit 312. The control unit may be one or more processors, controllers, or the like, programmed with instructions that may be executed. The instruction unit 311 issues an instruction related to reading and writing of information stored in the wireless tag Tg based on a timing at which the sheet St is detected by the detection unit 320 (hereinafter referred to as "detection timing"). The instruction related to reading and writing includes a writing instruction for causing the wireless tag communication device 60 to write information to the wireless tag Tg and a reading instruction for causing the wireless tag communication device 60 to read information from the wireless tag Tg. When the writing instruction is present, the wireless tag communication device 60 performs a writing process of writing information to the wireless tag Tg. When the reading instruction is present, the wireless tag communication device 60 performs a reading process of reading information from the wireless tag Tg.

Specific Examples of Writing Instruction and Reading Instruction

The instruction unit 311 issues the writing instruction at a detection timing by the detection unit 320. Specifically, the instruction unit 311 issues the writing instruction when the sheet St is aligned by the registration roller 53. Accordingly, the wireless tag communication device 60 performs the writing process when the sheet St is aligned by the registration roller 53.

The instruction unit 311 issues the reading instruction at a predetermined timing after issuing the writing instruction. The predetermined timing may be a timing at which information indicating that information is written is received from the wireless tag communication device 60 after the writing instruction, or may be a timing at which a predetermined time elapses after the writing instruction. In the present embodiment, the reading instruction is issued when the sheet St is aligned by the registration roller 53, similarly to the writing instruction. Accordingly, the wireless tag communication device 60 performs the reading process when the sheet St is aligned by the registration roller 53.

Other Examples of Writing Instruction and Reading Instruction

The reading instruction may be issued at the detection timing by the detection unit 320. In other words, the instruction unit 311 may issue the reading instruction at the detection timing of the sheet St by the detection unit 320. However, the reading instruction is performed after the writing instruction. Specifically, the instruction unit 311 issues the reading instruction to the wireless tag communication device 60 after issuing the writing instruction. For example, the instruction unit 311 may issue the writing instruction at a timing at which the sheet St is detected by the conveyance sensor 52a, and thereafter, may issue the reading instruction at a timing at which the sheet St moves downstream and the sheet St is detected by the registration sensor 53a. In other words, the writing instruction and the reading instruction may be issued with detection timings of different sensors as a trigger. Even in this case, the instruction unit 311 can issue the reading instruction after the writing instruction.

Processing Unit 312

The processing unit 312 acquires a result of reading and writing (hereinafter referred to as a "reading and writing result") in accordance with the reading instruction from the wireless tag communication device 60. The reading and writing result indicates either "normal" or "abnormal". "Normal" indicates that both writing of information to the wireless tag Tg and reading of information from the wireless tag Tg are performed normally. In the case of "normal", the wireless tag communication device 60 receives a response signal indicating that reading and writing of information from and to the wireless tag Tg is normal in the reading process.

On the other hand, "abnormal" indicates that at least one of writing and reading is not performed normally. In the case of "abnormal", the wireless tag communication device 60 does not receive a response signal indicating normal from the wireless tag Tg in the reading process. "Abnormal" may occur when appropriate writing to the wireless tag Tg cannot be performed or appropriate reading from the wireless tag Tg cannot be performed due to a communication failure or the like.

The processing unit 312 performs processes based on the reading and writing result. For example, when the reading and writing result indicates normal, the processing unit 312 performs a process of forming an image on the sheet St. That is, the processing unit 312 feeds the sheet St from the registration roller 53 to the secondary transfer unit 38, and transfers the toner image on the intermediate transfer body 31 to the sheet St by the secondary transfer unit 38.

When the reading and writing result indicates abnormal, the processing unit 312 performs a process of not forming an image on the sheet St. The process of not forming an image is a process related to so-called void printing. In the void printing, the sheet St is discharged to the sheet discharge unit 55 as a blank sheet. When the reading and writing result indicates abnormal, the processing unit 312 performs a process of notifying the abnormality (error). The notification is performed via the display 110 or a speaker included in the image forming apparatus 100.

Process Related to Reading and Writing of Information From and to Wireless Tag Tg Next, a process related to reading and writing of information from and to the wireless tag Tg, which is a process performed by the image forming apparatus 100, will be described with reference to FIG. 4.

FIG. 4 is a flowchart illustrating an example of the process related to reading and writing of information from and to the wireless tag Tg. In FIG. 4, the image formation control unit 310 (image forming apparatus 100) starts printing when there is an instruction for starting printing from the control panel 120 or another device (ACT 401). By starting printing, the pickup roller 51 picks up the sheet stored in the sheet storage unit 140 and conveys the picked-up sheet downstream in the sheet conveying direction.

Thereafter, the registration sensor 53a (example of detection unit 320) is turned on by detecting the sheet St (ACT 402). Before the registration sensor 53a is turned on, the conveyance sensor 52a is also turned on.

Then, the image formation control unit 310 issues, to the wireless tag communication device 60, a writing instruction to the wireless tag Tg (ACT 403). When there is a writing instruction from the image formation control unit 310, the wireless tag communication device 60 starts detection of the wireless tag Tg and determines whether the wireless tag Tg is detected (ACT 404). Specifically, the wireless tag communication device 60 issues, to the wireless tag Tg, a transmission request of a response signal related to writing at a predetermined interval in ACT 404.

In ACT 404, when the wireless tag Tg is detected (ACT 404: YES), that is, when a response signal related to writing is received from the wireless tag Tg, the wireless tag communication device 60 transmits writing information to the wireless tag Tg and writes information to the wireless tag Tg (ACT 405). When information is written to the wireless tag Tg, the sheet St is aligned by the registration roller 53.

Thereafter, the image formation control unit 310 issues a reading instruction of the wireless tag Tg to the wireless tag communication device 60 (ACT 406). When there is a reading instruction from the image formation control unit 310, the wireless tag communication device 60 reads information from the wireless tag Tg. Specifically, the wireless tag communication device 60 issues a transmission request of a response signal indicating that reading and writing of information from and to the wireless tag Tg is normal. The wireless tag communication device 60 transmits, to the image formation control unit 310, the reading and writing result based on a reception result of the response signal.

Then, the image formation control unit 310 determines whether the reading and writing result received from the wireless tag communication device 60 indicates normal (ACT 407). When the reading and writing result indicates normal (ACT 407: YES), the image forming apparatus 100 prints an image on the sheet St (ACT 408). Then, the sheet St is discharged from the sheet discharge unit 55 (ACT 409), and a series of processes ends.

When the wireless tag Tg is not detected in ACT 404 (ACT 404: NO), that is, when a response wave is not received from the wireless tag Tg, or when the reading and writing result indicates abnormal in ACT 407 (ACT 407: NO), the image forming apparatus 100 executes an error process (ACT 410). Then, the image forming apparatus 100 performs void printing (ACT 411), and proceeds to ACT 409.

As described above, the image forming apparatus 100 according to the present embodiment includes the wireless tag communication device 60 that reads and writes information from and to the wireless tag Tg when the sheet St passes through a predetermined position on the conveyance path (sheet conveying unit 50). The image forming apparatus 100 also includes the detection unit 320 that is disposed upstream of the predetermined position in the sheet conveying direction and detects the sheet St. Further, the image forming apparatus 100 issues an instruction related to reading and writing of information stored in the wireless tag Tg based on the detection timing of the sheet St by the detection unit 320.

Accordingly, information can be written to or read from the wireless tag Tg at an appropriate position where the sheet St approaches the wireless tag communication device 60. Therefore, radio waves of both the sheet St and the wireless tag communication device 60 cannot be shielded depending on a positional relation therebetween, and it is possible to appropriately write information to the wireless tag Tg or read information from the wireless tag Tg. Thus, it is possible to suppress occurrence of an error related to reading and writing of information from and to the wireless tag Tg.

The image forming apparatus 100 according to the present embodiment issues a writing instruction to the wireless tag Tg at the detection timing of the sheet St. Accordingly, the information can be written to the wireless tag Tg at an appropriate timing when the sheet St approaches the wireless tag communication device 60. Thus, the information can be stably written to the wireless tag Tg. Accordingly, it is possible to suppress occurrence of an error related to writing of information to the wireless tag Tg.

The image forming apparatus 100 according to the present embodiment issues a reading instruction to the wireless tag communication device 60 after issuing a writing instruction. Accordingly, the information of the wireless tag Tg can be read at an appropriate timing when the sheet St approaches the wireless tag communication device 60. Thus, information can be stably read from the wireless tag Tg. Accordingly, it is possible to suppress occurrence of an error related to reading of information from the wireless tag Tg.

In the image forming apparatus 100 according to the present embodiment, the detection unit 320 detects the leading end of the sheet St. The wireless tag Tg is attached to the leading end of the sheet St. Accordingly, it is possible to detect a position close to the wireless tag Tg by detecting the leading end of the sheet St. Therefore, the detection accuracy of the wireless tag Tg can be improved. Thus, more stable writing and reading can be performed.

In the image forming apparatus 100 according to the present embodiment, the detection unit 320 is the conveyance sensor 52a or the registration sensor 53a. In other words, the detection unit 320 is disposed upstream, in the sheet conveying direction, of a transfer unit (secondary transfer unit 38) that transfers an image to the sheet St, and detects the sheet fed from the sheet storage unit 140. Accordingly, the writing instruction and the reading instruction can be issued at an optimum timing after the sheet St is fed from the sheet storage unit 140. Thus, writing of information to the wireless tag Tg and reading of information from the wireless tag Tg can be stably performed.

In the image forming apparatus 100 according to the present embodiment, the detection unit 320 is the registration sensor 53a which detects that the sheet St reaches the registration roller 53. Accordingly, the writing instruction and the reading instruction can be issued at an optimal timing after the sheet St is fed from the sheet storage unit 140. Thus, writing of information to the wireless tag Tg and reading of information from the wireless tag Tg can be more stably performed.

The image forming apparatus 100 according to the present embodiment issues a writing instruction to the wireless tag communication device 60 when the sheet St is aligned by the registration roller 53. Accordingly, when the sheet is stopped, information can be written to the wireless tag Tg. Thus, since the positional relation between the sheet St and the wireless tag communication device 60 can be kept unchanged, it is possible to suitably suppress shielding of radio waves of both the sheet St and the wireless tag communication device 60 during the writing process. Accordingly, information can be written to the wireless tag Tg more stably.

The image forming apparatus 100 according to the present embodiment issues a reading instruction to the wireless tag communication device 60 when the sheet St is aligned by the registration roller 53. Accordingly, when the sheet is stopped, information can be written to the wireless tag Tg. Thus, since the positional relation between the sheet St and the wireless tag communication device 60 can be kept unchanged, it is possible to suitably suppress shielding of radio waves of both the sheet St and the wireless tag communication device 60 during the reading process. Thus, information can be stably read from the wireless tag Tg.

The image forming apparatus 100 according to the present embodiment performs a process of not forming an image on the sheet St when the result of reading and writing according to the instruction related to reading and writing is not normal. Accordingly, when there is an abnormality in reading and writing of information from and to the wireless tag Tg, the sheet St can be prevented from being used.

When the reading and writing result is not normal, the image forming apparatus 100 according to the present embodiment performs a process of notifying the abnormality. Accordingly, the user can understand that an abnormality occurs in reading and writing of information from and to the wireless tag Tg. The user can take measures in accordance with the abnormality.

Modifications

Next, modifications of the embodiment will be described. In each of the following modifications, the description of the contents described in the above-described embodiment will be appropriately omitted. It is also possible to combine each of the following modifications and the above-described embodiment.

First Modification

In the above-described embodiment, an example in which reading and writing from and to the wireless tag Tg illustrated in FIG. 4 are performed based on an instruction (ACT 403, ACT 406) from the image formation control unit 310 is described. In the first modification, an example in which reading and writing are not performed based on an instruction from the image formation control unit 310, but are performed based on control of a control unit (hereinafter, referred to as a "reading and writing control unit") included in the wireless tag communication device 60 will be described.

In the first modification, as a process corresponding to ACT 402, the reading and writing control unit acquires a detection result indicating that the registration sensor 53a is turned on. In other words, the registration sensor 53a outputs a detection result of the sheet St to the reading and writing control unit. When the detection result is acquired, the reading and writing control unit starts detection of the wireless tag Tg (ACT 404: YES), and performs writing by transmitting writing information to the wireless tag Tg (ACT 405).

Then, the wireless tag communication device 60 reads information from the wireless tag Tg on a condition that the writing information is transmitted to the wireless tag Tg. Then, the wireless tag communication device 60 obtains a reading and writing result (normal or abnormal) based on a reception result of a response signal indicating that reading and writing of information from and to the wireless tag Tg is normal. The wireless tag communication device 60 transmits the reading and writing result to the image formation control unit 310.

In this way, it is also possible to perform reading and writing from and to the wireless tag Tg based on control of the reading and writing control unit instead of the instruction from the image formation control unit 310. In the first modification, an example in which neither the writing instruction (ACT 403) nor the reading instruction (ACT 406) from the image formation control unit 310 is performed is described. However, at least one of these instructions may not be issued.

Second Modification

Next, a second modification will be described. In the above-described embodiment, an example in which the same processes (ACT 410 and ACT 411) are performed in a case where the wireless tag Tg is not detected in ACT 404 (ACT 404: NO) and a case where the reading and writing result is abnormal in ACT 407 (ACT 407: NO) is described. In the second modification, an example in which different processes are performed in a case of ACT 404: NO and ACT 407: NO will be described.

In the second modification, when the wireless tag Tg is not detected in ACT 404 (ACT 404: NO), the processing unit 312 notifies an error indicating that the wireless tag Tg is not detected, for example. Alternatively, in this case, the processing unit 312 may notify an error indicating that writing to the wireless tag Tg cannot to be performed.

On the other hand, when the reading and writing result indicates abnormal in ACT 407 (ACT 407: NO), the processing unit 312 notifies an error indicating that the reading and writing result indicates abnormal (at least one of writing and reading is abnormal), for example. Alternatively, in this case, the processing unit 312 may notify an error indicating that reading cannot be performed.

In the case of ACT 404: NO and ACT 407: NO, different printing may be performed so as to cause the user to recognize each error (type of abnormality). For example, the processing unit 312 may print a mark indicating that the wireless tag Tg is not detected or a mark indicating that the reading and writing result is abnormal.

According to the second modification, it is possible to perform processes in accordance with the type of abnormality. Accordingly, the type of the occurred abnormality can be presented to the user. Thus, the user can take measures in accordance with the type of abnormality.

A part of the functions of the image forming apparatus 100 (sheet conveying apparatus 300) in the above-described embodiment may be implemented by a computer. In this case, a program for implementing this function is recorded in a computer-readable recording medium. The program may be implemented by causing a computer system to read and execute the program recorded on the recording medium in which the above-described program is recorded.

The functions of the image forming apparatus 100 (sheet conveying apparatus 300) in the above-described embodiment may be implemented by a computer. In this case, a program for implementing the functions may be recorded in a computer-readable recording medium, and the program recorded in the recording medium may be read and executed by a computer system. The "computer system" as used herein includes hardware such as OS and a peripheral device. The "computer-readable recording medium" refers to a portable medium such as a flexible disk, a magneto-optical disk, a ROM, or a CD-ROM, or a storage device such as a hard disk incorporated in a computer system. Further, the "computer-readable recording medium" may include a medium that dynamically holds a program for a short period of time, such as a communication line when a program is transmitted via a network such as the Internet or a communication line such as a telephone line, and a medium that holds a program for a certain period of time, such as a volatile memory in a computer system serving as a server or a client in this case. The program may be a program for implementing a part of the functions described above, or may be a program that can implement the functions described above in combination with a program already recorded in the computer system.

Hereinafter, appendixes according to the present embodiment will be disclosed.

Appendix 1

A sheet conveying apparatus including:
a reading and writing unit configured to read and write information from and to a wireless tag provided on a sheet when the sheet passes through a predetermined position on a conveyance path;
a detection unit disposed upstream of the predetermined position in a sheet conveying direction and configured to detect the sheet; and
an instruction unit configured to issue an instruction related to reading and writing of the information from and to the wireless tag based on a timing at which the sheet is detected by the detection unit.

Appendix 2

The sheet conveying apparatus according to appendix 1, in which
the instruction unit issues, to the reading and writing unit at the timing, a writing instruction for writing the information to the wireless tag.

Appendix 3

The sheet conveying apparatus according to appendix 2, in which
the instruction unit issues, to the reading and writing unit after issuing the writing instruction, a reading instruction for reading the information from the wireless tag.

Appendix 4

The sheet conveying apparatus according to any of appendixes 1 to 3, in which
the detection unit detects a leading end of the sheet.

Appendix 5

The sheet conveying apparatus according to any of appendixes 1 to 3, in which
the detection unit is disposed upstream, in the sheet conveying direction, of a transfer unit configured to transfer an image to a sheet, and detects the sheet fed from a sheet storage unit.

Appendix 6

The sheet conveying apparatus according to appendix 5, further including:

a registration unit configured to align a sheet feeding timing when the sheet is fed to the transfer unit, in which the detection unit detects that the sheet reaches the registration unit.

Appendix 7

The sheet conveying apparatus according to appendix 6, in which the instruction unit issues, to the reading and writing unit, a writing instruction for writing the information to the wireless tag when the sheet is aligned by the registration unit.

Appendix 8

The sheet conveying apparatus according to appendix 6, in which the instruction unit issues, to the reading and writing unit, a reading instruction for reading the information from the wireless tag when the sheet is aligned by the registration unit.

Appendix 9

The sheet conveying apparatus according to any of appendixes 1 to 3, further including:

a processing unit configured to perform a process based on a result of reading and writing in accordance with the instruction related to reading and writing, in which the processing unit performs a process of not forming an image on the sheet when the result of reading and writing is not normal.

Appendix 10

The sheet conveying apparatus according to appendix 9, in which when the result of reading and writing is not normal, the processing unit performs a process of notifying the abnormality.

Appendix 11

A program for causing a computer to function as a sheet conveying apparatus, the sheet conveying apparatus including:

a reading and writing unit configured to read and write information from and to a wireless tag provided on a sheet when the sheet passes through a predetermined position on a conveyance path; and a detection unit disposed upstream of the predetermined position in a sheet conveying direction and configured to detect the sheet, the program causing the computer to function as an instruction unit configured to issue an instruction related to reading and writing of information from and to the wireless tag based on a timing at which the sheet is detected by the detection unit.

While certain embodiments have been described, the embodiments are presented by way of example only, and are not intended to limit the scope of the exemplary embodiments. The embodiments may be implemented in various other forms, and various omissions, substitutions, and changes can be made in a scope not departing from the gist of the exemplary embodiments. The embodiments and the modifications thereof are included in the scope and the gist of the disclosure, and are included in the scope of the disclosure disclosed in the claims and equivalents thereof.

What is claimed is:

1. A sheet conveying apparatus comprising:

a wireless tag communication device configured to read and write information from and to a wireless tag disposed on a sheet when the sheet passes through a predetermined position on a conveyance path;

a detector comprising a conveyance sensor and a registration sensor, the detector disposed upstream of the predetermined position in a sheet conveying direction and configured to detect the sheet; and one or more processors configured to issue a writing instruction at a timing at which the sheet is detected by the conveyance sensor, and then issue a reading instruction at a timing at which the sheet is detected by registration sensor.

2. The apparatus according to claim 1, wherein the detector is disposed upstream, in the sheet conveying direction, of a transfer unit configured to transfer an image to a sheet, wherein the transfer unit includes one or more rollers, and the detector is configured to detect the sheet fed from a sheet storage.

3. The apparatus according to claim 2, further comprising:

a registration roller configured to align the sheet by transferring, when the sheet is fed to the transfer unit, the sheet at a predetermined timing, wherein the detector is configured to detect that the sheet reaches the registration roller.

4. The apparatus according to claim 3, wherein the one or more processors are configured to issue, to the wireless tag communication device, a writing instruction for writing the information to the wireless tag when the sheet is aligned by the registration roller.

5. The apparatus according to claim 1, wherein the one or more processors are configured to:

perform a process based on a result of reading and writing in accordance with the instruction related to reading and writing, and perform a process of not forming an image on the sheet when the result of reading and writing is not normal.

6. The sheet conveying apparatus according to claim 5, in which when the result of reading and writing is not normal, the one or more processors are configured to perform a process of notifying the abnormality.

7. The sheet conveying apparatus according to claim 1, in which the one or more processors are configured to issue, to the wireless tag communication device at the timing, a writing instruction for writing the information to the wireless tag.

8. The sheet conveying apparatus according to claim 7, in which the one or more processors are configured to issue, to the wireless tag communication device after issuing the writing instruction, a reading instruction for reading the information from the wireless tag.

9. The sheet conveying apparatus according to claim 1, in which the detector is configured to detect a leading end of the sheet.

10. The sheet conveying apparatus according to claim 1, in which the one or more processors are configured to issue, to the wireless tag communication device, a reading instruction for reading the information from the wireless tag when the sheet is aligned by the registration roller.

11. A non-transitory computer readable storage medium for causing one or more processors to cause sheets to be conveyed in a sheet conveying apparatus, the sheet conveying apparatus including:

a wireless tag communication device configured to read and write information from and to a wireless tag provided on a sheet when the sheet passes through a predetermined position on a conveyance path; and a detector disposed upstream of the predetermined position in a sheet conveying direction and configured to detect the sheet, the detector comprising a registration sensor and a conveyance sensor;

the computer readable storage medium causing the one or more processors to issue a writing instruction at a timing at which the sheet is detected by the conveyance sensor, and then issue a reading instruction at a timing at which the sheet is detected by registration sensor.

12. The non-transitory computer readable storage medium according to claim 11, wherein the detector is disposed upstream, in the sheet conveying direction, of a transfer unit configured to transfer an image to a sheet, wherein the transfer unit includes one or more rollers, and the detector detects the sheet fed from a sheet storage.

13. The non-transitory computer readable storage medium according to claim 12, wherein the sheet conveying apparatus further comprising a registration roller configured to align, when the sheet is fed to the transfer unit, the sheet by transferring the sheet at a predetermined timing, and the detector is configured to detect that the sheet reaches the registration roller.

* * * * *